United States Patent
Gupta et al.

(10) Patent No.: US 7,222,422 B2
(45) Date of Patent: May 29, 2007

(54) METHOD FOR REFURBISHING SURFACES SUBJECTED TO HIGH COMPRESSION CONTACT

(75) Inventors: Bhupendra Kumar Gupta, Cincinnati, OH (US); Edward John Emilianowicz, West Chester, OH (US); Thomas J. Kelly, Cincinnati, OH (US); Glenn H. Nichols, Mason, OH (US); Marek M. Steplewski, Pharr, TX (US)

(73) Assignee: General Electric Company, Schenectady, NY (US)

( * ) Notice: Subject to any disclaimer, the term of this patent is extended or adjusted under 35 U.S.C. 154(b) by 100 days.

(21) Appl. No.: 10/708,205

(22) Filed: Feb. 16, 2004

(65) Prior Publication Data

US 2005/0181231 A1    Aug. 18, 2005

(51) Int. Cl.
*B23P 6/00*    (2006.01)

(52) U.S. Cl. .............. 29/889.1; 29/402.03; 29/402.04; 29/402.06; 29/402.07; 29/402.09; 29/402.11; 29/402.13; 29/402.16; 29/402.18; 29/17.3; 29/17.2; 228/119

(58) Field of Classification Search .............. 428/679, 428/635; 29/17.2, 17.3, 889.1, 402.03, 402.04, 29/402.06, 402.07, 402.09, 402.11, 402.13, 29/402.16, 402.18, 423; 228/119; 416/189, 416/204
See application file for complete search history.

(56) References Cited

U.S. PATENT DOCUMENTS

| | | | |
|---|---|---|---|
| 4,795,313 A | 1/1989 | Coulon | |
| 5,098,133 A | 3/1992 | Glover | 285/23 |
| 5,634,767 A | 6/1997 | Dawson | 415/134 |
| 5,902,421 A | 5/1999 | Christy | 148/528 |
| 6,004,683 A * | 12/1999 | Rafferty et al. | 428/551 |
| 6,164,916 A | 12/2000 | Frost et al. | 416/189 |
| 6,398,103 B2 | 6/2002 | Hasz et al. | 228/119 |
| 6,422,818 B2 | 7/2002 | Mashey | 416/96 R |
| 6,485,678 B1 | 11/2002 | Liang et al. | 420/37 |
| 6,530,971 B1 * | 3/2003 | Cohen et al. | 75/254 |
| 2001/0006187 A1 | 7/2001 | Hasz et al. | |
| 2002/0076571 A1 * | 6/2002 | Johnson et al. | 428/553 |
| 2002/0189722 A1 * | 12/2002 | Hasz et al. | 428/680 |
| 2003/0066177 A1 * | 4/2003 | Schnell et al. | 29/402.18 |
| 2003/0180143 A1 | 9/2003 | Um et al. | |
| 2004/0096322 A1 * | 5/2004 | Caddell et al. | 415/210.1 |

* cited by examiner

*Primary Examiner*—Jennifer McNeil
*Assistant Examiner*—Gordon R. Baldwin
(74) *Attorney, Agent, or Firm*—David L. Narciso; Gary M. Hartman; Domenica N.S. Hartman

(57) ABSTRACT

A process for refurbishing a worn surface of a shroud support component of a turbomachine, as well as a shroud support component refurbished with the process. The process generally entails removing a surface region of the worn surface so as to define a repair surface on the component. A braze tape formed from a slurry to comprise a braze material and a wear-resistant alloy is then applied to the repair surface, followed by a heat treatment to cause the braze tape to diffusion bond to the repair surface so as to define a built-up surface. The built-up surface is then machined to define a wear-resistant coating on the component.

13 Claims, 1 Drawing Sheet

METHOD FOR REFURBISHING SURFACES SUBJECTED TO HIGH COMPRESSION CONTACT

BACKGROUND OF INVENTION

1. Field of the Invention

The present invention generally relates to structures subject to excessive wear due to high compression contact, such as shroud support assemblies installed in aircraft gas turbine engines and other turbomachinery. More particularly, this invention relates to an improved method for refurbishing a shroud support assembly in the high pressure turbine section of a gas turbine engine.

2. Description of the Related Art

High bypass turbofan engines have a large fan that compresses incoming air, which is delivered to the combustion chamber and to the turbine section in the rear of the engine to generate additional engine thrust. The turbine is contained within a case equipped with a shroud, such that the shroud circumscribes the turbine and is adjacent to the tips of the turbine blades. The extent to which the blades, shroud and surrounding shroud support structure can be manufactured to close tolerances to minimize losses between the shroud and turbine blade tips is complicated by manufacturing tolerances, different rates of thermal expansion, and dynamic effects. As such, wear is also inevitable, particularly between the shroud and shroud support. An example of the latter is a stage 1 high pressure turbine (HPT) shroud support section 10 represented in FIGS. 1 and 2. In this example, the lip 14 and face 16 located at the forward flange 12 of the shroud support section 10 is particularly susceptible to excessive wear due to high compression contact with the stage 1 HPT nozzle outer band aft surfaces (not shown). The excessively worn surfaces can result in a non-serviceable condition of the shroud support section 10.

Various approaches have been developed for refurbishing worn surfaces of a shroud support, including building up these surfaces by thermal spraying a chromium carbide, nickel-base alloy or Co—Mo—Cr—Si alloy, or by weld build-up such as with the cobalt-base L605 superalloy. These refurbishment approaches, though successful, do not provide a long-term solution to the wear and dimensional degradation of shroud supports, thus adversely impacting fit, form and functionality. Furthermore, high manufacturing cost and cycle time resulting from thermal spray, welding and machining operations result in delays in repair/overhaul engine shipment and ultimately customer dissatisfaction. As an alternative, commonly-assigned U.S. Pat. No. 6,398,103 to Hasz et al. discloses a technique by which a wear-resistant foil is brazed to a worn surface of a component. The foil is formed by thermal spraying a wear-resistant material on a support sheet. Suitable wear-resistant materials include chromium carbide materials and Co—Mo—Cr—Si alloys, such as the commercially-available TRIBALOY® T400 and T800 alloys.

Notwithstanding the above advancements, it would be desirable if methods were available for refurbishing shroud supports that were less complicated, less labor-intensive and less costly, yet still provided a long-term solution to the aforementioned wear and dimensional degradation problems.

SUMMARY OF INVENTION

The present invention provides a process for refurbishing a worn surface of a shroud support component of a turbomachine, as well as a shroud support component refurbished with the process. The process generally entails removing a surface region of the worn surface so as to define a repair surface on the shroud support component. A braze tape formed from a slurry to comprise a braze material and a wear-resistant alloy is then applied to the repair surface, followed by a heat treatment to cause the braze tape to diffusion bond to the repair surface so as to define a built-up surface. The built-up surface is then machined to define a wear-resistant coating on the shroud support component.

According to a preferred aspect of the invention, within the braze tape the braze material is dispersed in a matrix material of the wear-resistant alloy, preferably a cobalt alloy (an alloy whose predominant constituent is cobalt). As a result of the refurbishment process, the shroud support component comprises a wear-resistant coating diffusion bonded to a surface of the shroud support component, wherein the wear-resistant coating has a machined surface that defines a wear surface of the shroud support component that is suitable for supporting and high compression contact with a shroud component of the turbomachine. The wear-resistant coating can be readily formulated to have better wear resistance characteristics as compared to prior art coatings formed by thermal spraying, plasma spraying, and welding.

In view of the above, it can be seen that significant advantages of this invention include greater product life and durability, while also minimizing processing costs and cycle times. In particular, the refurbishment process results in a wear-resistant surface that can be provided with relatively low capital investment and substantially reduced manufacturing costs as compared to prior art thermal spraying, plasma spraying and welding repair techniques.

Other objects and advantages of this invention will be better appreciated from the following detailed description.

DETAILED DESCRIPTION

Figure 1:
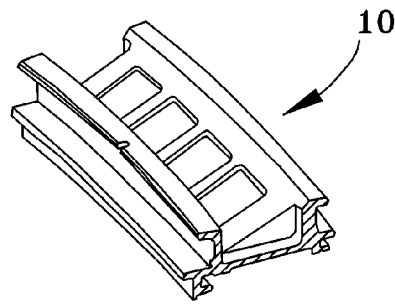
FIG. 1 is a perspective view of a shroud support section of an aircraft gas turbine engine.

As discussed above, FIGS. 1 and 2 represent a stage 1 high pressure turbine (HPT) shroud support section 10 of a type used in aircraft gas turbine engines to support a shroud (not shown), made up of multiple nozzles that surround the rotating components of a gas turbine engine. Various high-temperature materials can be used to form the support section 10, notable examples of which include René 41, René 77, R80 and MarM509, though the present invention is broadly applicable to the repair of essentially any metallic base alloy. The support section 10 has a forward flange 12 that defines a forward lip 14 and forward face 16 that are adapted to contact the outer band of an individual nozzle supported by the section 10. Contact of the lip 14 and face 16 with the nozzle is characterized by high compression forces and relative movement between the contacting surfaces as a result of manufacturing tolerances, differing rates of thermal expansion, and dynamic effects during operation of the engine. As such, the surfaces of the lip 14 and face 16 are prone to excessive wear that necessitates refurbishment of the worn surfaces.

Figure 2:
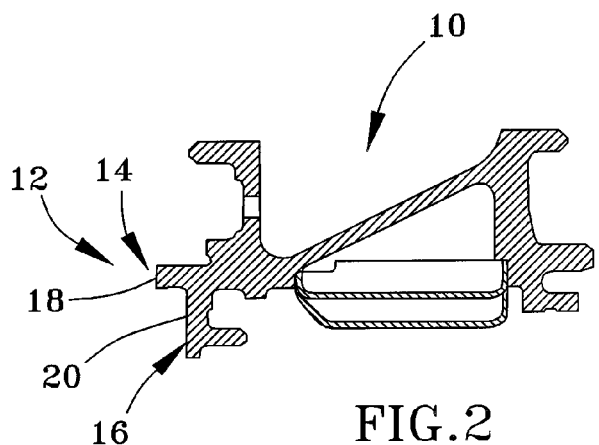
FIG. 2 represents a side view of the shroud support section of FIG. 1 following machining of worn surfaces at the forward flange of the support section.

FIG. 2 represents a first step of a process for refurbishing the shroud support section 10, involving removal of any worn or damaged surface portions of the lip 14 and face 16. This step is preferably carried out by first cleaning any oxides or other contaminants from the surfaces of the lip 14 and face 16, for example, by using such conventional processes as grit blasting, application of a suitable oxide removing solution, etc. The surfaces of the lip 14 and face 16 are then preferably machined to remove all damaged portions thereof, including remnants of any previous wear-resistant coating, to define machined repair surfaces 18 and 20 at which the underlying substrate material of the shroud support 10 is exposed. Machining can be performed by conventional machining practices, such as CNC milling.

Figure 3:
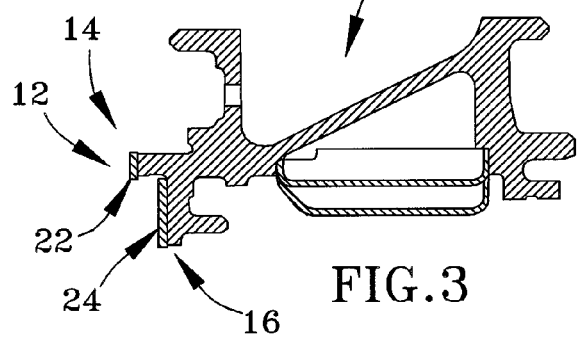
FIG. 3 represents a side view of the shroud support of FIG. 2 following application of braze tapes in accordance with the process of this invention.

FIG. 3 depicts the result of applying braze tapes 22 and 24 to the repair surfaces 18 and 20. According to a preferred aspect of the invention, the braze tapes 22 and 24 are formed to contain a braze material dispersed in a matrix of a wear-resistant alloy. Suitable braze materials are generally characterized by a composition whose base constituent is the same as the wear-resistant alloy, but with a lower melting temperature than the wear-resistant alloy. A particularly suitable braze material is a cobalt-base alloy containing, by weight, about 22.5 to 24.25% chromium, about 9.0 to 11.0% nickel, about 6.5 to 7.5% tungsten, about 3.0 to 4.0% tantalum, about 2.6 to 3.0% boron, with the balance cobalt and minor or incidental elements such as carbon, zirconium, iron, silicon, manganese, copper, oxygen, nitrogen, selenium, phosphorus, and/or sulfur. A preferred nominal composition for the braze material is, by weight, about 23% chromium, about 10% nickel, about 7% tungsten, about 3.5% tantalum, and about 2.8% boron, with the balance cobalt and incidental impurities. Such an alloy has been employed as an activated diffusion healing (ADH) bonding alloy by the assignee of the present invention for the repair of equiaxed superalloy components.

A suitable wear-resistant alloys is a cobalt-base alloy of a type commercially available from the Deloro Stellite Company, Inc., under the name TRIBALOY® T800. The T800 alloy contains, by weight, about 27 to about 29% molybdenum, about 16.5 to about 17.5% chromium, about 3.0 to about 3.5% silicon, up to about 3% iron, up to about 3% nickel, up to about 0.03% sulfur, up to about 0.03% phosphorus, and up to about 0.1% carbon, with the balance cobalt and incidental impurities. A preferred composition for the wear-resistant alloy is, by weight, about 27 to about 30% molybdenum, about 16.5 to about 18.5% chromium, about 3.0 to about 3.8% silicon, up to about 1.5% iron, up to about 1.5% nickel, with the balance cobalt and incidental impurities such as oxygen, carbon, sulfur, and phosphorus.

In the manufacture of the braze tapes 22 and 24, the braze material and wear-resistant alloy are preferably in powder form and blended to form a powder mixture consisting of, by weight, about 10% to about 30% of the braze material, preferably about 19% to about 21% of the braze material, with the balance essentially the wear-resistant alloy. The braze material powder has a preferred particle size range of about −270 mesh (53 micrometers maximum), preferably −325 mesh (44 micrometers maximum). The wear-resistant alloy powder has a preferred particle size range of about −200 mesh (75 micrometers maximum), preferably about −325 mesh (44 micrometers maximum). This powder mixture is then combined with a binder to form a slurry. A suitable composition for the binder is a polymeric or organic binder capable of burning off at a temperature of not higher than about 1200° F. (about 650° C.) to leave no undesirable residues. A preferred binder is a polyethylene commercially available from a variety of sources. The binder is combined with the powder mixture in a sufficient amount to form a slurry that can then be dried to yield a pliable sheet. For example, the slurry may be applied to a support sheet, which is then removed from the pliable sheet formed by drying the slurry. The resulting sheet is then sintered at a temperature sufficient to fuse (agglomerate) the powder particles and burn off the binder (e.g., about 200° C. to about 425° C.), after which the sintered sheet can be cut into tapes 22 and 24 of any desired shapes using a waterjet, laser or other suitable technique.

While a uniform dispersion of the braze material in the wear-resistant alloy matrix is preferred, it is foreseeable that the braze material and the wear-resistant alloy could be present within the tapes 22 and 24 as discrete layers. For example, the tapes 22 and 24 could be formed of alternating layers of the braze material and the wear-resistant alloy, in which case individual layers of braze material would preferably be thinner than individual layers of the wear-resistant alloy.

Figure 4:
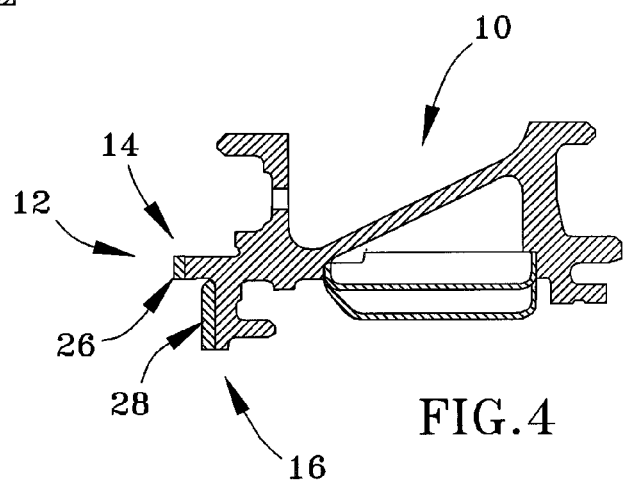
FIGS. 4 and 5 represent partial side views of the shroud support of FIGS. 2 and 3 following diffusion bonding of the braze tapes and machining of the resulting coatings in accordance with the process of this invention.

The braze tapes 22 and 24 are diffusion bonded to the repair surfaces 18 and 20 of the support section 10 using a vacuum heat treatment followed by aging. The tapes 22 and 24 may be attached to the repair surfaces 18 and 20 by a resistant welding method, e.g., tack welding at selected locations to assure temporary attachment. Alternatively, an inorganic adhesive may be used for this purpose. A suitable heat treatment is carried out at a temperature of about 2100° F. to about 2300° F. (about 1150° C. to about 1260° C.) for a duration of about ten to sixty minutes, more preferably at a temperature of about 2180° F. to about 2200° F. (about 1193° C. to about 1204° C.) for a duration of about ten to thirty minutes in a vacuum of less than $1 \times 10^{-3}$ torr (less than $1.3 \times 10^{-3}$ mbar). At the conclusion of the heat treatment, the braze tapes 22 and 24 have preferably flowed smoothly and evenly on the repair surfaces 18 and 20 with a linear shrinkage of less than 5% and a thickness shrinkage of less than 20%, yielding built-up coatings 26 and 28 represented in FIG. 4. Bonding between the coatings 26 and 28 and the repair surfaces 18 and 20 is preferably a minimum of 90%. Furthermore, the coatings 26 and 28 preferably have a porosity of not more than 4% by volume, with the major axis of any pore not exceeding 0.008 inches (about 0.2 mm) when measured by metallographic evaluation at 100×, and a maximum of one inclusion being present in any field of view examined at 50× magnification.

Following heat treatment, the coatings 26 and 28 undergo primary aging to further bond the coatings 26 and 28 to the repair surfaces 18 and 20. The primary aging step is preferably performed at a temperature of about 2000° F. to about 2100° F. (about 1090° C. to about 1150° C.) for a duration of about one to about four hours. A secondary aging step is preferably performed at a temperature of about 1400° F. (about 760° C.) for about four hours if the material being repaired is René 77, René 41, or another alloy whose strength may diminish at the braze temperature.

Figure 5:
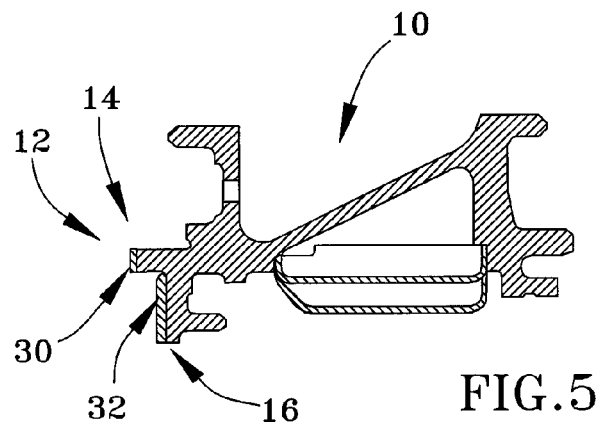

Following aging, the built-up coatings 26 and 28 are machined to reacquire the dimensions and surface conditions required for the wear surfaces of the lip 14 and face 16. Surface finish is particularly important in that a rough surface will result in higher wear rates. As such, the surfaces of the resulting machined coatings 30 and 32 (FIG. 5) preferably have surface finishes on the order of about 30 to about 40 micro-inches (about 1 to about 3 micrometers) Ra.

While the invention has been described in terms of a particular embodiment, it is apparent that other forms could be adopted by one skilled in the art. Therefore, the scope of the invention is to be limited only by the following claims.

The invention claimed is:

1. A process for refurbishing a worn surface of a component subject to high compression contact, the process comprising the steps of:
    removing a surface region of the worn surface so as to define a repair surface on the component;
    forming a braze tape from a slurry, the braze tape comprising a powder of a metallic cobalt-base wear-resistant alloy and a powder of a cobalt-base braze material having a lower melting temperature than the wear-resistant alloy, wherein the wear-resistant alloy consists of, by weight, about 27 to about 29% molybdenum, about 16.5 to about 17.5% chromium, about 3.0 to about 3.5% silicon, up to about 3% iron, up to about 3% nickel, with the balance cobalt, minor alloying elements, and incidental impurities;
    applying the braze tape to the repair surface;
    heat treating the braze tape and the repair surface to cause the braze tape to diffusion bond to the repair surface so as to define a built-up surface;
    aging the braze tape at a temperature of about 1090° C. to about 1150° C. for a duration of about one to about four hours; and then
    machining the built-up surface to remove a surface portion of the braze tape and define a wear-resistant coating on the component.

2. The process according to claim 1, wherein the braze tape when applied to the repair surface consists essentially of the braze material and the wear-resistant alloy.

3. The process according to claim 1, wherein the braze tape is formed by a method comprising:
    combining the powder of the braze material, the powder of the wear-resistant alloy, and a binder to form the slurry in which the powders are dispersed; and
    forming and sintering the braze tape to remove the binder.

4. The process according to claim 1, wherein the braze material consists of, by weight, about 22.5 to 24.25% chromium, about 9.0 to 11.0% nickel, about 6.5 to 7.5% tungsten, about 3.0 to 4.0% tantalum, about 2.6 to 3.0% boron, with the balance cobalt, minor alloying elements, and incidental impurities.

5. The process according to claim 1, wherein the braze tape contains, by weight, about 10% to about 30% of the braze material and about 70% to about 90% of the wear-resistant alloy.

6. The process according to claim 1, wherein the component is a shroud support component of a turbomachine and the worn surface is on a support flange of the shroud support component, the support flange being adapted for supporting a shroud component of the turbomachine.

7. The process according to claim 1, wherein after the aging step the braze tape undergoes a second aging step at a temperature of about 760° C. for about four hours.

8. The process according to claim 1, wherein as a result of the machining step the surface of the wear-resistant coating has a surface finish of about 1 to about 3 micrometers Ra.

9. A process for refurbishing a shroud support component of a gas turbine engine, the shroud support component having a forward flange having a forward lip and a forward face that have worn surfaces as a result of being in high compression contact with an outer band of a nozzle of the gas turbine engine, the process comprising the steps of:
    disassembling the nozzle from the shroud support component;
    removing a surface region from each of the worn surfaces so as to define repair surfaces on the shroud support component;
    forming braze tapes by combining a powder of a braze material, a powder of a metallic wear-resistant cobalt alloy, and a binder to form a slurry in which the powders are dispersed, wherein the wear-resistant cobalt alloy consists of, by weight, about 27 to about 29% molybdenum, about 16.5 to about 17.5% chromium, about 3.0 to about 3.5% silicon, up to about 3% iron, up to about 3% nickel, with the balance cobalt, minor alloying elements, and incidental impurities, and then forming and sintering to remove the binder, each of the braze tapes consisting of the braze material dispersed in a matrix material of the wear-resistant cobalt alloy;
    attaching the braze tapes to the repair surfaces;
    heat treating the braze tapes and the repair surfaces to cause the braze tapes to diffusion bond to the repair surfaces so as to define built-up surfaces;
    aging the braze tapes at a first temperature of about 1090° C., to about 1150° C. for a duration of about one to about four hours; and then
    machining the built-up surfaces to remove a surface portion of each of the braze tapes and define wear-resistant coatings on the shroud support component.

10. The process according to claim 9, wherein the braze material consists of, by weight, about 22.5 to 24.25% chromium, about 9.0 to 11.0% nickel, about 6.5 to 7.5% tungsten, about 3.0 to 4.0% tantalum, about 2.6 to 3.0% boron, with the balance cobalt, minor alloying elements, and incidental impurities.

11. The process according to claim 9, wherein the braze tape contains, by weight, about 19% to about 21% of the braze material and the balance essentially the wear-resistant cobalt alloy.

12. The process according to claim 9, wherein after the aging step the braze tapes undergo a second aging step at a temperature of about 760° C. for about four hours.

13. The process according to claim 9, wherein as a result of the machining step the surfaces of the wear-resistant coatings have surface finishes of about 1 to about 3 micrometers Ra.

* * * * *